(12) United States Patent
Skardon

(10) Patent No.: US 12,193,370 B2
(45) Date of Patent: Jan. 14, 2025

(54) HYDROPONIC WATER TREATMENT SYSTEM

(71) Applicant: Tailwater Systems, LLC, Seaside, CA (US)

(72) Inventor: John N. Skardon, Seaside, CA (US)

(73) Assignee: Tailwater Systems, LLC, Seaside, CA (US)

(*) Notice: Subject to any disclaimer, the term of this patent is extended or adjusted under 35 U.S.C. 154(b) by 0 days.

(21) Appl. No.: 18/673,935

(22) Filed: May 24, 2024

(65) Prior Publication Data

US 2024/0397885 A1 Dec. 5, 2024

Related U.S. Application Data

(60) Provisional application No. 63/505,076, filed on May 31, 2023.

(51) Int. Cl.
*A01G 27/00* (2006.01)
*A01G 27/06* (2006.01)
*C02F 3/32* (2023.01)

(52) U.S. Cl.
CPC .......... *A01G 27/005* (2013.01); *A01G 27/06* (2013.01); *C02F 3/327* (2013.01); *C02F 3/32* (2013.01); *C02F 2203/006* (2013.01); *C02F 2209/05* (2013.01)

(58) Field of Classification Search
CPC ....... A01G 27/005; A01G 27/06; C02F 3/327; C02F 3/32; C02F 2203/006; C02F 2209/05

USPC .............. 210/602, 739, 903, 906, 143, 614; 47/59 R, 62 R
See application file for complete search history.

(56) References Cited

U.S. PATENT DOCUMENTS

| 4,211,037 | A | * | 7/1980 | Green | A01G 27/06 47/62 C |
| 11,180,394 | B2 | | 11/2021 | Yan et al. | |
| 2003/0024874 | A1 | * | 2/2003 | Wallace | C02F 3/00 210/150 |
| 2005/0044788 | A1 | * | 3/2005 | Tang | A01G 31/00 47/59 S |

(Continued)

FOREIGN PATENT DOCUMENTS

WO WO-2016022999 A1 * 2/2016 ............... C02F 3/04

*Primary Examiner* — Fred Prince
(74) *Attorney, Agent, or Firm* — HESLIN ROTHENBERG FARLEY & MESITI P.C.

(57) ABSTRACT

A hydroponic water treatment system incudes a supply tank configured to receive water having contaminants dissolved therein. An irrigation pump is in fluid communication with the supply tank. The irrigation pump is configured to pump the water out of the supply tank. One or more above ground first containerized plant systems include a first growing container. A first plant having a first root system is disposed in a substrate contained in the first growing container. A first holding container is configured to contain the first growing container therein. The first holding container includes a fluid connection. The fluid connection is in fluid communication with the supply tank. The first root system is configured to receive a first portion of the water from the irrigation pump via drip irrigation and the fluid connection is configured to return a second portion of the water to the supply tank.

18 Claims, 6 Drawing Sheets

(56) References Cited

U.S. PATENT DOCUMENTS

| | | | |
|---|---|---|---|
| 2012/0074057 A1* | 3/2012 | Kovalak | C02F 3/327 210/151 |
| 2012/0192487 A1* | 8/2012 | Tanaka | C02F 9/00 47/60 |
| 2014/0033609 A1* | 2/2014 | Tyler | A01G 31/06 47/62 R |
| 2014/0237897 A1* | 8/2014 | Lotvak | A01G 31/02 47/62 R |
| 2015/0068121 A1* | 3/2015 | Probst | A01G 31/06 47/59 R |
| 2021/0007303 A1* | 1/2021 | Adams | A01G 9/02 |
| 2023/0200319 A1* | 6/2023 | Almadani | G16Y 20/10 47/62 R |

* cited by examiner

HYDROPONIC WATER TREATMENT SYSTEM

CROSS REFERENCE TO RELATED APPLICATIONS

This application is a non-provisional application of, and claims the benefit of the filing date of, U.S. provisional application 63/505,076, filed May 31, 2023, entitled: "HYDROPONIC WATER TREATMENT SYSTEM," the contents of which are incorporated herein by reference in their entirety.

TECHNICAL FIELD

The present disclosure relates to hydroponic water treatment system and methods of using the same. More specifically, the disclosure relates to hydroponic water treatment systems for removing salt and ions from contaminated water, and methods of using such hydroponic water treatment systems to perform phytoremediation on such contaminated water.

BACKGROUND

Food and forage crops need a variety of nutrients to grow and achieve desired yield per acre. But salts are continuously infiltrating the surface and ground water, threatening crops around the world. Sodium chloride (NaCl) is seen as a global threat to the future food supply. Both sodium and chloride are difficult targets for removal when dissolved in water. Sodium has very high solubility in water and is generally not reactive with any common ions found in irrigation or agricultural drainage water. Chloride, unlike sodium, can be removed via a technique that involves in-situ formation of a precipitate called a "layered double hydroxide". However, this technique requires substantial skill and the use of caustic chemicals.

Moreover, agricultural drainage water comes from farmer's fields. Drainage water is normally captured in reservoirs or discharged to land or other water conveyances such as canals, rivers, or the ocean. It typically contains unused nutrients and suspended or dissolved ions. Treating drainage water so it can be safely discharged or reused is a difficult problem for at least two reasons. First, the drainage is often high in sulfate (SO4), nitrate (NO3), phosphate (PO4) and chloride (Cl). The presence of cations like calcium (Ca) increases the chance that Calcium Sulfate (CaSO4) may form in the treatment system, leading to scaling and equipment failure.

Second, many growing areas are under regulations that prohibit "dumping" or land application of untreated drainage water or releasing the untreated water into our lakes, rivers, and ocean.

Additionally, the volume of wastewater leaving many growing areas can be substantial. This creates the potential need to build very expensive water treatment facilities for each farm, which is financially impractical. Reducing the volume of water via thermal evaporation is impractical for two reasons. First, the volume of water would require enormous power consumption to boil the water and release the water vapor into the environment. Second, the calcium sulfate scaling potential dramatically increases with higher temperatures. Trying to "boil" your way out of this problem is not possible.

Accordingly, there is a need for a water treatment system that can remove salt from the water efficiently, at low power consumption and at an affordable cost. Additionally, there is a need for a water treatment system that can also remove cations and anions from the water efficiently, at low power consumption and at low cost, with a reduced need to add chemical additives.

BRIEF DESCRIPTION OF THE INVENTION

The present disclosure offers advantages and alternatives over the prior art by providing a hydroponic water treatment system that includes one or more containerized plant systems. The containerized plant systems include one or more types of halophyte plants to treat agricultural drainage water and/or other types of contaminated water. The halophyte plants are grown in growing containers composed of moisture-wicking fabric. The growing containers are configured to encourage fine, hair-like, root growth and air pruning of roots of the halophyte plants that extend through the fabric of the growing container.

The halophyte plants may be a salt tolerant type of halophyte plant configured for maximum evapotranspiration. The halophyte plants may be hyperaccumulator halophyte plants configured to store salt in the tissue of the plants. The halophyte plants may be recretohalophyte plants configured to secret salt from the plants.

A hydroponic water treatment system in accordance with one or more aspects of the present disclosure includes a supply tank configured to receive water having ions and salts dissolved therein. An irrigation pump is in fluid communication with the supply tank. The irrigation pump is configured to pump the water out of the supply tank. One or more first containerized plant systems are in fluid communication with the irrigation pump. The first containerized plant systems are above ground and The first containerized plant systems each include a first growing container, and a first plant having a first root system disposed in a substrate contained in the first growing container. Each of the one or more containerized plant systems are configured to receive a first portion of the water into the first root system, and return a second portion of the water to the supply tank.

Another hydroponic water treatment system in accordance with one or more aspects of the present disclosure includes a supply tank configured to receive water having contaminants dissolved therein. An irrigation pump is in fluid communication with the supply tank. The irrigation pump is configured to pump the water out of the supply tank. One or more above ground first containerized plant systems include a first growing container. A first plant having a first root system is disposed in a substrate contained in the first growing container. A first holding container is configured to contain the first growing container therein. The first holding container includes a fluid connection. The fluid connection is in fluid communication with the supply tank. The first root system is configured to receive a first portion of the water from the irrigation pump via drip irrigation and the fluid connection is configured to return a second portion of the water to the supply tank.

Another hydroponic water treatment system in accordance with one or more aspects of the present disclosure incudes a supply tank configured to receive water having ions and salt dissolved therein. An irrigation pump is in fluid communication with the supply tank. The irrigation pump is configured to pump the water out of the supply tank. An array of first containerized plant systems is in fluid communication with the irrigation pump. The first containerized plant systems each include a first growing container and a first plant having a first root system disposed in a substrate contained in the first growing container. An array of second containerized plant systems is also in fluid communication with the irrigation pump. The second containerized plant systems each include a second growing container and a second plant having a second root system disposed in a substrate contained in the second growing container. Each of the first containerized plant systems are configured to receive a first portion of the water from the irrigation pump into the first root system and return a second portion of the water to the supply tank. Each of the second containerized plant systems are configured to receive a third portion of the water from the irrigation pump into the second root system and return a fourth portion of the water to the supply tank.

A method of phytoremediation in accordance with one or more aspects of the present disclosure includes receiving water having ions and salts dissolved therein into a supply tank. The water in the supply tank is pumped into a first array of first containerized plant systems. Each first containerized plant system includes a first growing container and a first plant. Each first plant has a first root system disposed in a substrate contained in the first growing container. A first portion of the water is absorbed into each of the first root systems. A second portion of the water is returned to the supply tank. The water in the supply tank is pumped into a second array of second containerized plant systems. Each second containerized plant system includes a second growing container and a second plant that is different from the first plant. Each second plant has a second root system disposed in a substrate contained in the second growing container. A third portion of the water is absorbed into each of the second root systems. A fourth portion of the water is returned to the supply tank.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

DRAWINGS

The disclosure will be more fully understood from the following detailed description taken in conjunction with the accompanying drawings, in which.

Figure 4:
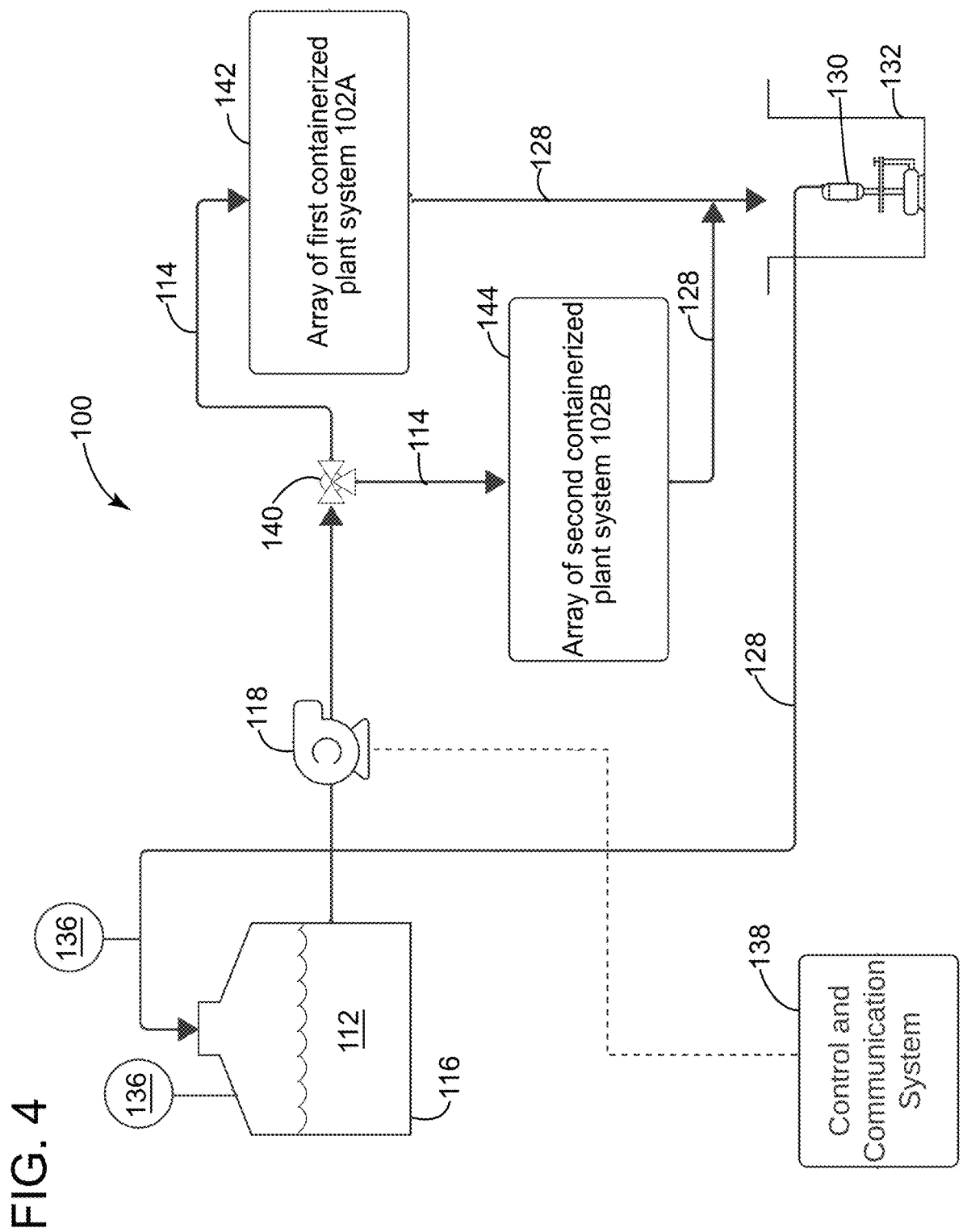
FIG. 4 depicts an example of a schematic of a hydroponic water treatment system containing an array of first containerized plants systems and an array of second containerized plant systems, according to aspects described herein.
Figure 5:
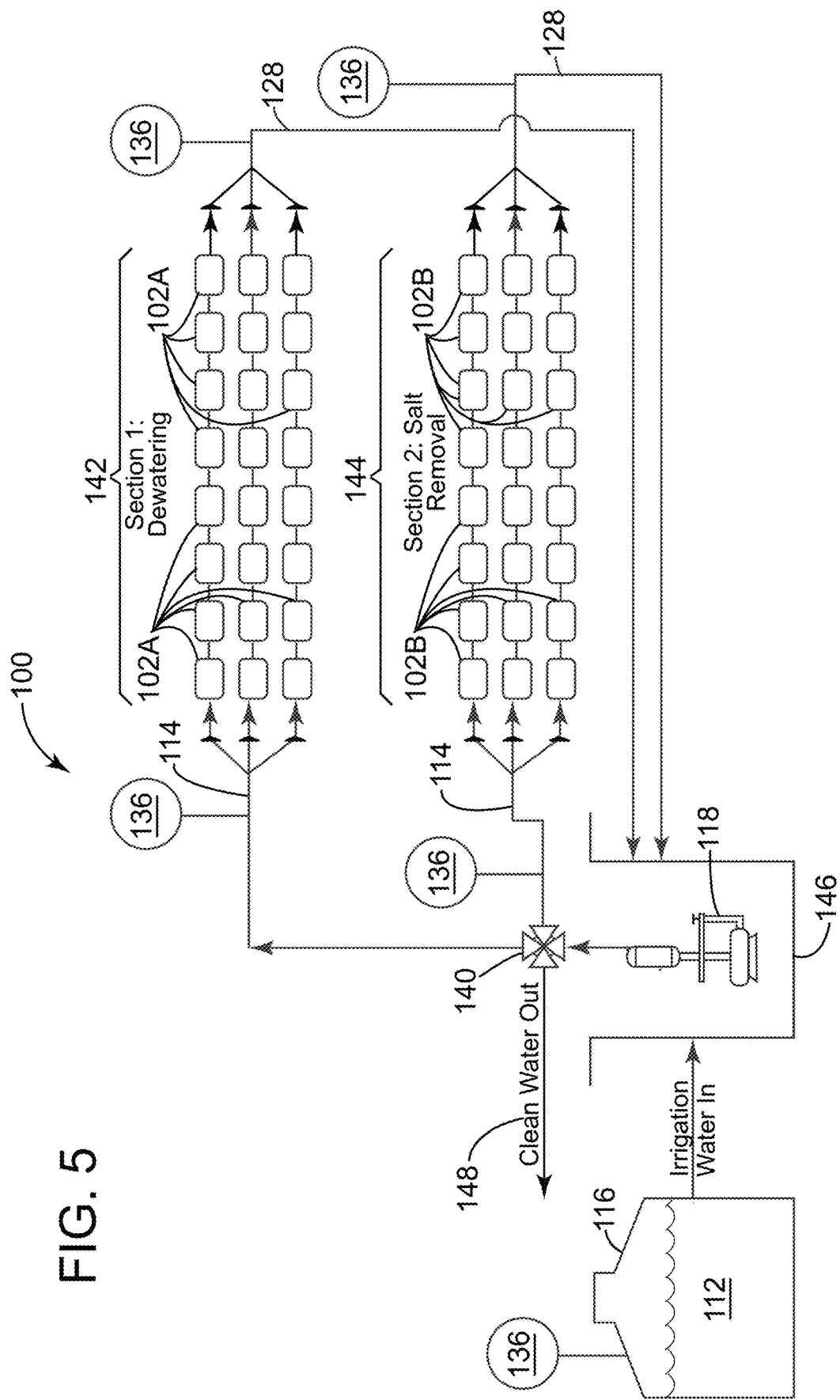
Figure 6:
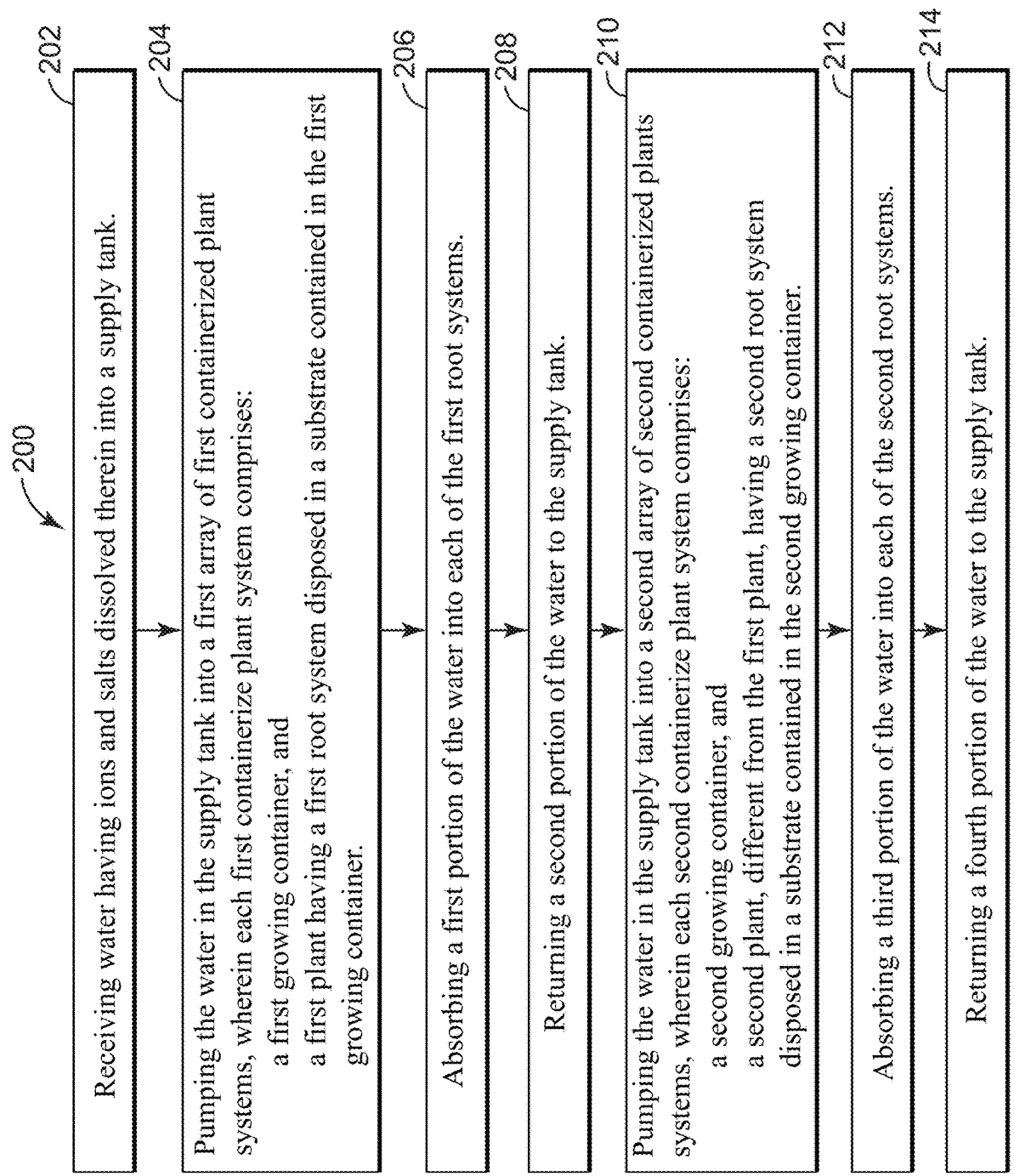

FIG. 5 depicts an example of a schematic of the hydroponic water treatment system of FIG. 4, wherein the array of first containerized plant systems is an 8×3 array, and the array of second containerized plant systems is an 8×3 array, according to aspects described herein; and FIG. 6 depicts an example of a flow diagram using a hydroponic water treatment system to perform phytoremediation on contaminated water, according to aspects described herein.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "significantly", "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
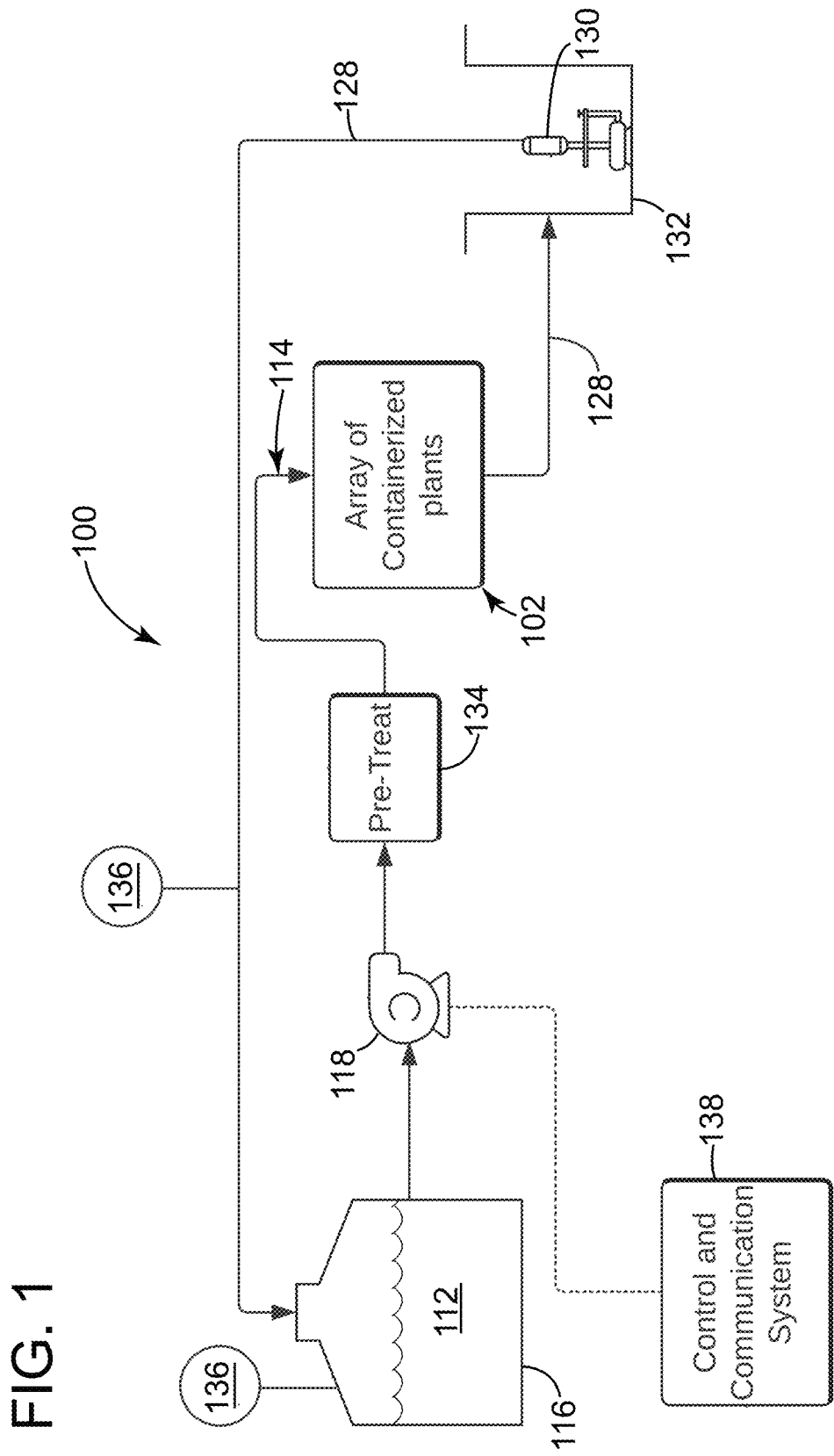
FIG. 1 depicts an example of a schematic of a hydroponic water treatment system having one or more containerized plant systems, according to aspects described herein.
Figure 2:
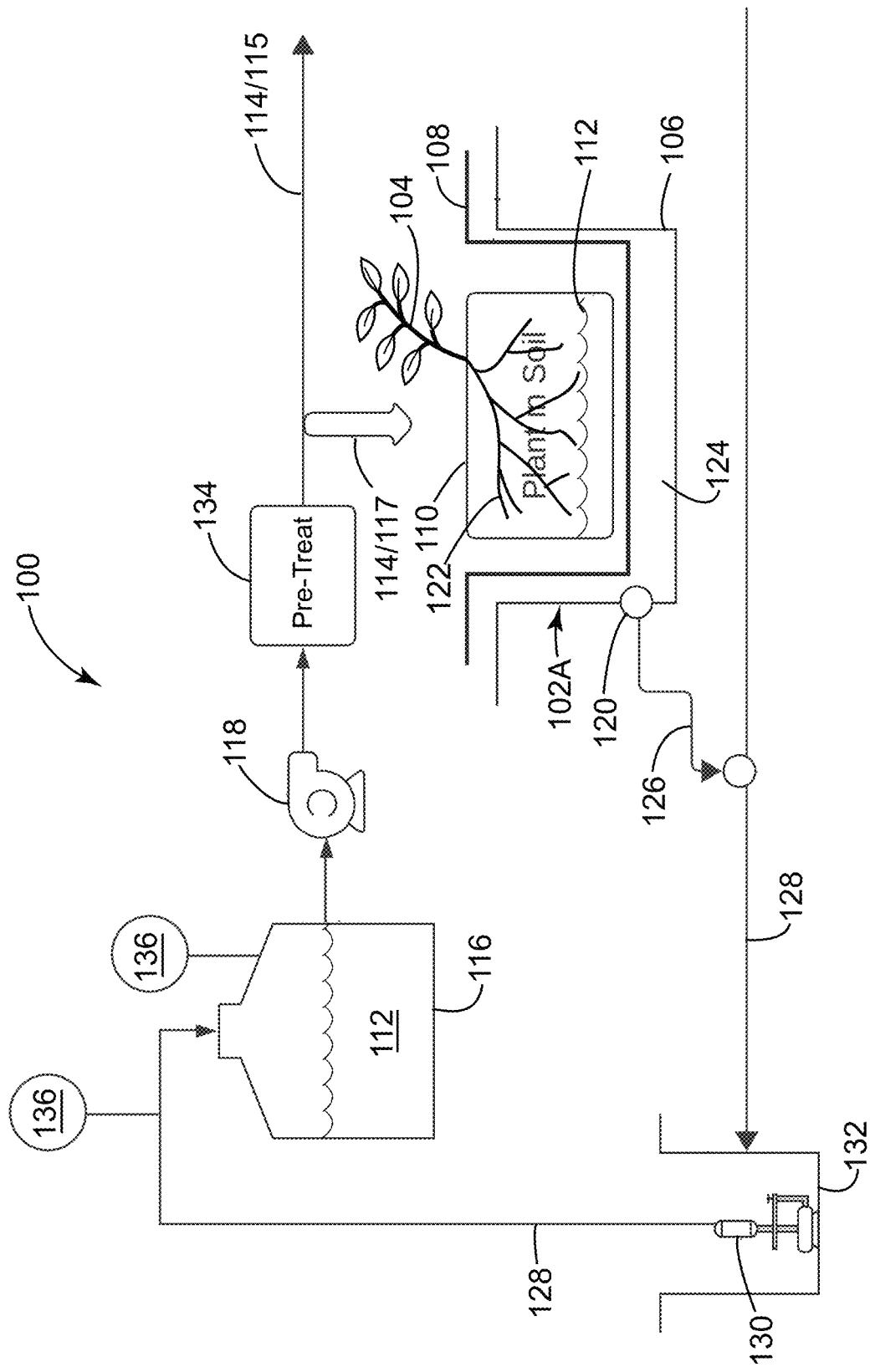
FIG. 2 depicts an example of a schematic of the hydroponic water treatment system of FIG. 1, wherein one of the containerized plant systems is illustrated in greater detail, according to aspects described herein.

Referring to FIGS. 1 and 2, an example is depicted of a schematic of a hydroponic water treatment system 100 having one or more containerized plant systems 102A (FIG. 1); and an example is depicted of the hydroponic water treatment system 100, wherein one of the containerized plant systems 102A is illustrated in greater detail (FIG. 2), according to aspects described herein.

Hydroponics, as used herein, involves growing plants 104 in a containerized plant system 102. The containerized plant systems 102 may be above ground. The containerized plant system 102 may include a holding container 106, which houses a growing container 108 therein. The growing container 108 contains a water-based nutrient solution, i.e., a substrate 110. The substrate (e.g., soil) 110 that is used can be varied for specific requirements. Plants 104 may receive water 112 and nutrients via drip irrigation system 114. The drip irrigation system may have a common fee line 115 that feeds to every one of the at least one containerized plant systems 102. A branch irrigation line 117 may feed each individual containerized plant systems with water 112 and nutrients from the common feed line 115.

Water 112 that accumulates in the bottom of the plant's holding container 106 and growing container 108 may be drained away and reused. Hundreds and thousands of these containerized plant systems 102 can be connected together. Plants 104 may be grown this way to minimize water loss and to carefully control nutrient flow.

Note, when referring to containerized plant systems in general, the reference number 102 is used herein. However, as will be explained in greater detail herein, some of the examples of hydroponic water treatment systems 100 depict both a first containerized plant system 102A and a second containerized plant system 102B. The first and second containerized plant systems 102A, 102B include different plants 104 selected to perform different treatment tasks on the water 112. However, the basic structure of the containerized plant system 102, as described above, remains substantially the same in both the first and second containerize plant systems 102A and 102B. Accordingly, for purposes of simplicity, even though the structural components (e.g., holding container, growing container, plant or the like) associated with the first and second containerized plant systems 102A, 102B may be referred to as first and second structural components (e.g., first holding container and second holding container), the reference numbers used to refer to them will remain the same (e.g., first holding container 106 and second holding container 106).

More specifically, in FIGS. 1 and 2, the hydroponic water treatment system 100 includes a supply tank 116 configured to receive water 112 having ions and salts dissolved therein. The water 112 may be untreated drainage water or irrigation water from a farming operation.

An irrigation pump 118 is in fluid communication with the supply tank 116. The irrigation pump 118 is configured to pump the water 114 out of the supply tank 112. The water 112 is pumped from the supply tank 116 to irrigate one or more (for example an array) of specially curated plants 104 contained in a first containerized plant system 102A via, for example, a drip irrigation system 114. The drip irrigation system 114 may be installed in close proximity to the surface of the growing container 108 in order to administer a precise amount of water 112, which may be measured in gallons per hour.

The first containerized plant systems 102A each include a first holding container 106 configured to contain a first growing container therein 108. The first holding container 106 includes a first fluid connection 120 (for example, a pipe nipple or a pipe elbow). The first fluid connection 120 is in fluid communication with the supply tank 116.

A first plant 104 having a first root system 122 is disposed in a substrate 110 contained in the first growing container 108. The first root system 122 is configured to receive a first portion of the water 112 from the drip irrigation system 114. Each of the first fluid connections 120 of the one or more containerized plant systems 102A are configured to return a second portion of the water 112 to the supply tank 116.

During irrigation, water not absorbed by the root system 122 of the plant 104 will percolate past the root system 122 and fill a reservoir 124 at the bottom of the holding container 106. This is the second portion of water 112 that is to be returned to the supply tank 116. Once the water level in the bottom reservoir 124 rises high enough, it will reach the first fluid connection 120, located in this case near the bottom of the holding container 106. The second portion of the water 112 then passes through the first fluid connection 120 and drains away from the holding container 106 via a drain line 126. The water then flows from the drain line 126 into a common return line 128 and is returned to the supply tank 116. The second portion of the water 112 from each of the first containerized plant systems 106 may flow back to the supply tank 116 via gravity feed. Alternatively, the second portion of the water 112 may flow back to the supply tank 116 with a pump assist from a second pump 130 (e.g. a sump pump 130) that may be positioned in a second tank (such as a cistern) 132. The suction side and pressurized side of the second pump 130 may be connected to the common return line 128 between the first containerized plant systems 102 and the supply tank 116.

Advantageously, the growing containers 108 may be composed of a moisture-wicking material, that is also breathable to allow for air flow through the growing container 108 and around the root system 122. The air flow around the root system 122 is also advantageously maximized if the containerized plant system 102 is above ground, rather than planted into the ground.

Examples of such materials for growing containers are various types of nylon, polyethylene or polypropylene. Growing containers 108 may also be made of various breathable natural fabrics, such as jute or cotton. The moisture-wicking materials of the growing containers 108 contain pores that draw water 112 away from an inside of the growing container 108 and onto an outer surface of the growing container 108. The pores may be smaller than a water droplet and larger than moisture vapor to draw water vapor out from inside of the growing container 108 and hold out the water once it has condensed on the outer surface of the growing container. 108. The water on the outer surface of the growing container 108 will then advantageously evaporate, especially if the containerized plant system 102 is above the ground. The pores may be micropores, which have a diameter of less than 2 nanometers. As such, the growing containers 108 can provide extremely high directional evaporation, similar to the exercise clothes that are designed to keep your skin dry during workouts.

With growing containers 108 composed of breathable, moisture-wicking material, three processes begin at once during irrigation of the containerized plant systems 102. First, water migrating to the edge of the containers 108 is evaporated off of the outer surface area of the growing container 108. Second, water 112 absorbed by the root system 122 (i.e., the first portion of the water 112) travels up the xylem of the plant 104 and is transpired (i.e., evaporated) by the above ground plant 104 biomass. Third, the growing container 108 encourages fine root hair development in the root system 122 and enables constant "air pruning" of roots that may penetrate the container 108. The net result is that plants 104 grown in these growing containers 108 develop extremely dense root balls of primarily fine root hairs, leading to much greater water and nutrient uptake.

Air pruning, as used herein, happens naturally when roots are exposed to air. The roots are effectively "burned" off, causing the plant to constantly produce new and healthy branching roots. Advantageously, air pruning is maximized when the containerized plant systems 102 are above the ground level.

As discussed earlier, the water 112 in supply tank 116 may be untreated agricultural drainage or irrigation water 112. However, nearly all agricultural drainage and a substantial amount of irrigation water 112 is high in dissolved cations and anions. Some of these ions can damage plant growth, reduce yield per acre during irrigation, or constantly foul drip irrigation systems. Other ions such as sodium and chloride (which come from dissolved salt) can cause yield losses and plant damage.

Advantageously, to counter the pervasive salt problem, the plant hydroponic water treatment system 100 may use various select halophyte plants and trees. Halophytes are plants that grow naturally in soils having a high content of various salts. Halophytes have developed a wide range of adaptive strategies to help them thrive in saline environments. Further, various halophyte plants have developed ion specific pathways that only allow certain types of ions to enter the root system 122 of the plants 104.

Moreover, many halophyte plants are well adapted to high sulfate conditions or the presence of chloride salts. Common grasses such as fast growing tall wheatgrass (*Thinopyrum ponticum*) readily uptake large quantities of sulfate, nitrate, phosphate, and major cations (e.g. calcium, potassium). Additionally certain halophyte plants, such as wheatgrass have the ability to uptake a wide variety of ions and transpire a very large amount of water.

Three types of halophyte plant adaptations can be harnessed to remove problem ions from water. The first adaptation is salt tolerance, wherein the plant 104 is a salt tolerant halophyte plant. Many salt tolerant halophyte plants, such as Jose Tall Wheat Grass (JTWG) can grow well in moderately saline water but the plant does not accumulate sodium or chloride ions. JTWG will accumulate sulfate, calcium, magnesium, phosphorus and nitrate. This essentially softens the water and removes criteria pollutants such as nitrate. This also means that JTWG is an excellent choice to increase the salinity of water 112 in the hydroponic water treatment system 100.

Another beneficial attribute of tall forage grasses like JTWG is the large amount of water these plants can transpire daily. Water volume reduction, via evapotranspiration, leads to ion concentration increases (same mass of ions but much less water). Many plants used in phytoremediation are much more efficient when the initial concentration of ions is very high.

Accordingly, in one example of the hydroponic water treatment system 100, the first plant 104 may include a salt tolerant halophyte plant. In that case, the first portion of the water 112 taken up by the first root system 122 is evaporated from the first plant 104 via evapotranspiration. Since the salt is not taken up by the root system 122 of the salt tolerant halophyte type first plant 104, the salinity of the second portion of the water 112 is increased significantly. Therefore, the second portion of the water 112, that is ultimately returned to the supply tank 116, increases the salt concentration in the water 112 in the supply tank 116.

The second adaptation is salt accumulation, wherein the plant 104 is a hyperaccumulator halophyte plant. Some plants, such as salt bush (*Atriplex lentiformis*), are hyperaccumulator halophyte plants, which will pump sodium and chloride into the upper biomass, stems and leaves, for storage. The salt eventually leaves the plant when leaves die or drop from the plant. There are a wide variety of these plants-some are edible such as quinoa (*Chenopodium quinoa*). In general, salt accumulators (i.e., hyperaccumulator halophyte plants) can be used to "pump salt" from the applied irrigation water. The plants must be harvested to physically remove the salt from the environment.

Accordingly, in another example of the hydroponic water treatment system 100, the first plant 104 may include a hyperaccumulator halophyte plant (a salt accumulator plant). In that case, the first portion of the water 112 taken up by the first root system 122 also takes up the salt in the water 112, and stores the salt in the tissue of the first plant 104. Since the salt is taken up by the root system 122 of the hyperaccumulator halophyte type first plant 104, the salinity of the second portion of the water 112 is decreased significantly. Therefore, the second portion of the water 112, that is ultimately returned to the supply tank 116, decreases the salt concentration in the water 112 in the supply tank 116.

The third adaptation is salt excretion (or salt conduction), wherein the plant 104 is a recretohalophyte plant. This type of plant has specialized organs (salt glands) that accumulate sodium and chloride traveling up the plant xylem. The glands will excrete or pump the salt out of the plant, where it accumulates on the outer layer of stems and leaves. Prairie cord grass (*Spartina pectinata*) is an example of such a recretohalophyte plant that will pump sodium and chloride up through plant's xylem and then excrete the ions with other micronutrients onto the surface of leaves.

Accordingly, in another example of the hydroponic water treatment system 100, the first plant 104 may include a recretohalophyte plant. In that case, the first portion of the water 112 taken up by the first root system 122 also takes up the salt in the water 112, and excretes the salt from the tissue of the first plant 104. Since the salt is taken up by the root system 122 of the recretohalophyte type first plant 104, the salinity of the second portion of the water 112 is decreased significantly. Therefore, the second portion of the water 112, that is ultimately returned to the supply tank 116, decreases the salt concentration in the water 112 in the supply tank 116.

Additionally, in another example of the hydroponic water treatment system 100, the first plant 104 may include various other plants, in place of or in combination with halophyte plants, to perform various different treatment functions on the water 112. Table 1 provides examples of plants and plant families, and the primary water treatment functions they are capable of performing on the water 112 flowing through the hydroponic water treatment system 100.

TABLE I

Plants, Plant Families and Their Primary Water Treatment Functions.

| Family | Example | Primary Water Treatment Function |
|---|---|---|
| Poacae | Jose Tall Wheatgrass | evaporation, anion and cation uptake |
|  | Rye grass | Boron uptake |
| Amaranthaceae | Big Salt Bush | Salt uptake |
| Chenopodiaceae | Russian thistle, glasswort | Salt update |
| Brassicaceae | Mustard | Heavy metal |
| Salicaceae | Willow, poplars | evaporation, heavy metals |
| Graminae | Indian grass | hydrocarbon uptake |
| Asteraceae | Sunflower | Radioactive isotopes, heavy metal |

So, for example, mustard may be used as the plant 104 in the first containerized plant systems 102A to remove heavy metals from the water 112. Also, by way of example, Indian grass, may be used to remove hydrocarbons from the water 112.

The hydroponic water treatment system 100 may also include a pre-treat tank 134 positioned between, and in fluid communication with, the water 112 from the irrigation pump 118 and the one or more first containerized plant systems 102. The pre-treat tank 134 is configured to remove debris from, or to inject specialty chemicals and/or biostimulants into, the water 112 from the irrigation pump 118 prior to entering the one or more first containerized plant systems 102.

One example of a biostimulant is potassium (K). Research has indicated that increasing potassium (K) levels during growth can increase the amount of salt excreted by recretohalophytes. Likewise, certain plant hormones and other biostimulants are known to stimulate salt glands to excrete more salt. Hormones such as abscisic acid (ABA) and jasmonic acid (JA) can be used to stimulate the activity of salt glands.

Halophyte salt uptake, in general, may be stimulated through the use of several different methods. Seaweed extracts contain chemicals such as auxins, cytokinins, and betaines to help the plants maintain halophyte plant vigor. Humic substances, e.g., humic acid, may help plants uptake potassium and calcium. This helps maintain a proper balance between sodium and chloride and the plants' internal nutrients. Since all salt uptake occurs in the root system 122, plant growth promoting rhizobacteria (PGPR) can be used to inoculate the root system of the plants to make the halophytes more efficient in nutrient uptake. In addition, it may be possible to further salt uptake by adding small amounts of silicon, which may be used to strengthen plant tissues.

Biostimulants, in general, can be injected into pre-treat tank 134 and introduced into the containerized plant systems 102 via the drip irrigation 114 system of the hydroponic water treatment system 100. Alternatively, in the case of PGPRs, the plants 104 may be soaked in a bacteria solution prior to placement in the growing containers 108. Foliar sprays (liquid sprayed on leaves) can also be a way of injecting some of these nutrients into the plant. A wide range of biostimulants provides flexibility in modifying the operation of the hydroponic water treatment system 100 to match local conditions.

The hydroponic water treatment system 100 may also include at least one sensor 136 configured to measure a concentration of salt in the water 112. The concentration of salt may be, for example, in the supply tank or in the common return line 128. The at least one sensor 136 may be, for example, an electrical conductivity (EC) sensor. The EC of water 112 is indicative of the salt concentration in the water 112, wherein the lower the EC, the higher the salt concentration in the water 112, and the higher the EC, the lower the salt concentration in the water.

A control system 138 may be in electromagnetic communication with the irrigation pump 118. The control system 138 is configured to receive a salt concentration signal from the at least one sensor 136 indicative of a concentration of salt in the water 112. The control system 138 may be configured to control the cycling of the irrigation pump 118 to achieve a predetermined concentration of salt in the water 112 based on the salt concentration signal. The predetermined salt concentration may be, for example, in the water 112 in the supply tank 116 or the common return line 128 or elsewhere in the hydroponic treatment system 100.

Figure 3:
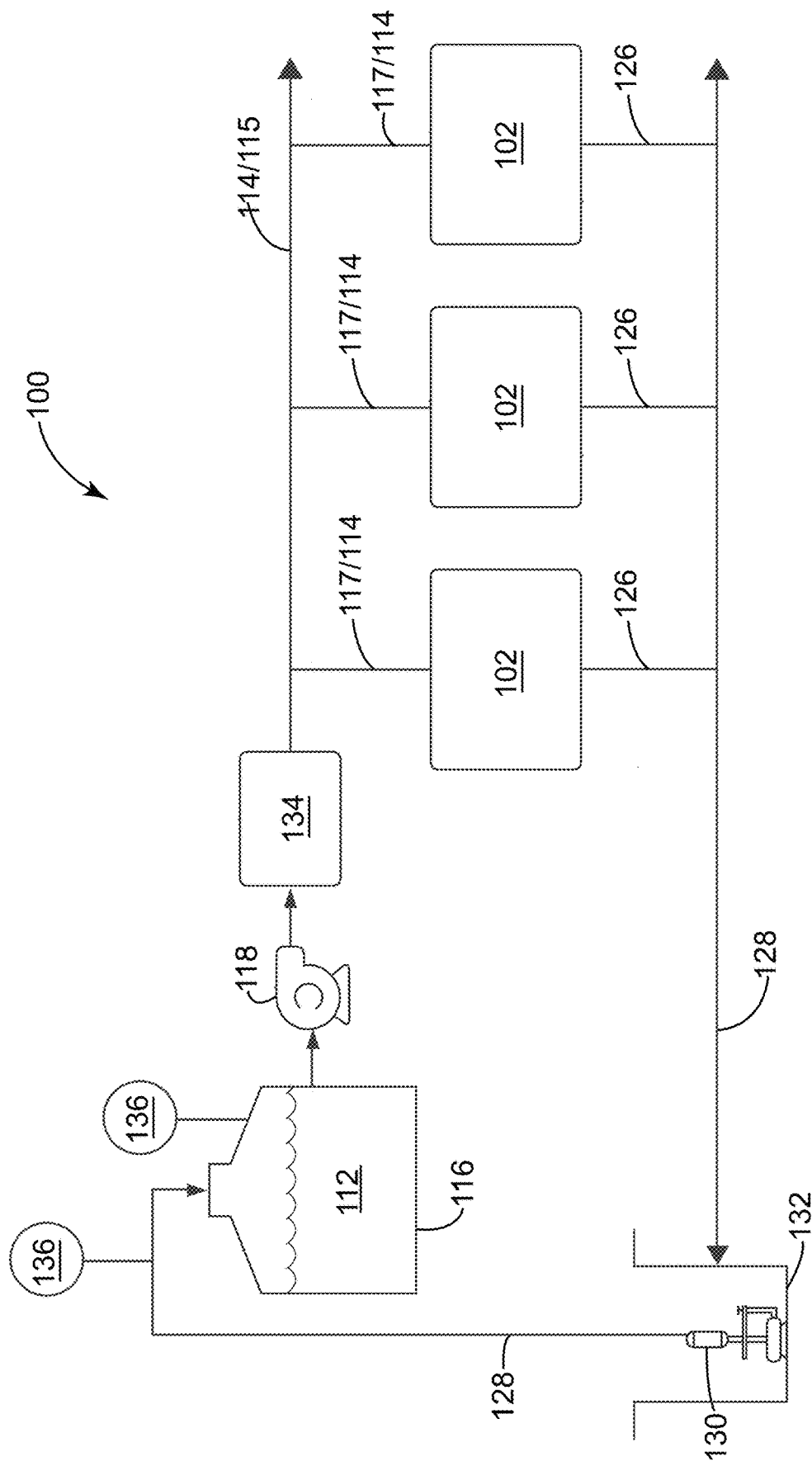
FIG. 3 depicts an example of a schematic of the hydroponic water treatment system of FIG. 1, wherein at least three containerized plant systems are illustrated in series, according to aspects described herein.

Referring to FIG. 3, an example is depicted of a schematic of the hydroponic water treatment system of FIG. 1, wherein at least three containerized plant systems 103 are illustrated in series, according to aspects described herein. The series containerized plant systems 102 are an example of a 1×N array of containerized plants systems 102 using a common fee line 117 and a common return line 128. The array may be 1×N or N×M array. An N×M array, wherein N and M are both greater than 1, would have multiple common feed lines 115 connected to the containerized plant systems 102 with all drain lines 126 eventually connecting into common return line 128.

Referring to FIG. 4, an example is depicted of a schematic of a hydroponic water treatment system 100 containing a first array 142 of first containerized plants systems 102A and a second array 144 of second containerized plant systems 102A, according to aspect described herein.

FIG. 4. is an example of multiple arrays of containerized plant systems (in this case a first array 142 of first containerized plant systems 102A and a second array 144 of second containerized systems 102B) connected to a common supply tank 116. The plants 104 in the first and second containerized plant systems 102A, 102B may be different species to effect a specific or broad type of ion removal. For example, in a salt removal process, plants 104 in the first array 142 of first containerized plant systems 102A can be fast growing halophytic grasses such as tall wheat grass. Drainage water 112 is filtered through the first array 142 of first containerized plant systems 102A until the volume of water or a water quality sensor 136 indicate that the ionic concentration as determined by, for example, an electrical conductivity or Total Dissolved Solids (TDS) style sensor indicates that the salt level is high enough for salt removal by salt removal plants 104 in the second array 144 of second containerized plant systems 102B.

More specifically, the hydroponic water treatment system 100 illustrated in FIG. 4, may include one or more (e.g., an array of) first containerized plant systems 102A connected in parallel to one or more (e.g., an array of) second containerized plant systems 102B. The one or more second containerized plant systems 102B are in fluid communication with the irrigation pump 118 through a selector valve system 140. The second array 144 of second containerized plant systems 102B each include a second plant 104, which is different from the first plant 104 in the first array 142 of first containerized plant systems 102A. The second plants 104 have a second root system 122 disposed in a substrate 110 contained in a second growing container 108 (see FIG. 2). Each of the one or more second containerized plant systems 102B are configured to receive a third portion of the water 112 into the second root system 122 and return a fourth portion of the water 112 to the supply tank 116.

A selector valve system 140 (for example a three way valve 140) is in fluid communication with the irrigation pump 118, the first array 142 of first containerized plant systems 102A and the second array 144 of second containerized plant systems 102B. The selector valve system 140 is configured to selectively connect a flow of the water 112 from the irrigation pump 118 to the first array 142 (i.e., one or more) of first containerized plant systems 102B or the second array 144 (i.e., one or more) of second containerized plant systems 102B.

Halophyte salt accumulators (i.e., hyperaccumulator halophyte plants) and conductors (i.e., recretohalophyte plants) are much more efficient at salt removal when faced with a high initial level of salt. However, such levels of salinity required for enhanced efficiency are generally not found on a conventional farm's drainage water 112.

Advantageously however, by combining the attributes of different types of halophytes and other plants, such as those listed in Table I herein, this issue, and other issues, can be address and can lead to solutions that cannot be done by existing prior art physicochemical methods. For example, the plants 104 of the first array 142 in FIG. 4 may be salt tolerant halophyte plants 104, such as Jose Tall Wheat Grass (JTWG), which can grow well in moderately saline water but do not accumulate sodium or chloride ions. Additionally, the plants 104 of the second array 144 in FIG. 4 may be hyperaccumulator halophyte plants (i.e., salt accumulators) such as salt bush (*Atriplex lentiformis*) or may be recretohalophyte plants (i.e., salt conductors) such as prairie cord grass (*Spartina pectinata*).

Also, by way of example, the water 112 may not be saline, but may be contaminated with heavy metals and boron ions. Accordingly, the plants 104 of the first array 142 in FIG. 4 may be Sunflowers to uptake the heavy metals (see Table I) and the plants 104 of the second array 144 in FIG. 4 may be Rye grass to uptake the boron ions (see Table I).

Accordingly, during operation of the hydroponic water treatment system of FIG. 4, the selector valve system 140 will first divert the flow of water 112 through the first array 142, wherein the root system 122 of the salt tolerant halophyte plants 104 will absorb the first portion of the water 112 from the supply tank 116, but will not absorb the salt in the drainage water 112. As a result, the second portion of the water 112 (not absorbed by the root system of the plants 104 of the first array 142) will then have a reduced volume and an increased salinity as the second portion of water 112 drains back to the supply tank 116. This cycle will continue until the sensors 136 indicate that the salinity in the water 112 has increased to a predetermined level.

Next during operation, the selector valve system 140 will divert the flow of water 112 through the second array 144, wherein the root system 122 of the salt accumulator plants or the salt conductor plants 104 will absorb the third portion of the water 112 from the supply tank 116 plus also absorb the salt in the water 112. As a result, the fourth portion of water 112 (not absorbed by the root system 122 of the plants 104 of the second array 144) will have a reduced volume plus a reduced salinity as the fourth portion of the water 112 drains back to the supply tank 116. This cycle will continue until the sensors 136 indicate that the salt in the water 112 has been sufficiently removed (i.e., reaches a predetermined low level) and is considered clean. The clean water may then be pumped out of the hydroponic water treatment system 100 for later use.

The method described above is also ideal for using various types of bio-stimulants to encourage the plant to uptake specific ions. In addition, the root systems 122 of the plants 104 can be inoculated with specialized rhizobacteria (bacteria that live on the surface of the roots and surrounding soil) that can facilitate nutrient uptake by the plants.

Referring to FIG. 5, an example is depicted of a schematic of the hydroponic water treatment system 100 of FIG. 4, wherein the first array 142 of first containerized plant systems 102A is an 8×3 first array 142 array. Additionally, the second array 144 of second containerized plant systems 102B is an 8×3 second array 144, according to aspects described herein.

The hydroponic water treatment system 100 of FIG. 5, includes the supply tank 116 configured to receive water 112 having ions and salt dissolved therein (e.g. farm drainage or irrigation water). An irrigation pump 118 (which, in this case, is a sump pump 118 disposed in a return tank 146) is in fluid communication with the supply tank 116. The irrigation pump 118 is configured to pump the water 112 out of the supply tank 116.

The first array 142 of first containerized plant systems 102A is in fluid communication with the irrigation pump 118 through selector valve system 140. The first containerized plant systems 102A each include a first growing container 108 disposed in a holding container 106. A first plant 104 (which in this case may be a salt tolerant halophyte plant) having a first root system 122 is disposed in a substrate 110 contained in the first growing container 108 (see FIG. 2). The second array 144 of second containerized plant systems 102B is also in fluid communication with the irrigation pump 118 through the selector valve system 140. The selector valve system is operable to select between the first array 142 and the second array 144.

The second containerized plant systems 102B each a second growing container 108 disposed in a holding container 106. A second plant (which in this case may be a hyperaccumulator halophyte plant or a recretohalophyte plant) having a second root system 122 is disposed in a substrate 110 contained in the second growing container 108.

Each of the first containerized plant systems 102A are configured to receive a first portion of the water 112 into the first root system 122 and return a second portion of the water 112 to the supply tank 116. Each of the second containerized plant systems 102B are configured to receive a third portion of the water 112 into the second root system 122 and return a fourth portion of the water 112 to the supply tank 116.

When the first plants 104 are salt tolerant halophyte plants, the first portion of the water 112 taken up by the first root system 122 is evaporated from the first plant 104 via evapotranspiration and the second portion of the water 112 has a higher salt concentration than the water 112 in the supply tank 116. The water 112 flowing from the supply tank 116, through the first array 142, and back to the supply tank 116 may cycle several times. This cycle will continue until the sensors 136 indicate that the salinity in the water 112 has increased to a predetermined high level, which is high enough for hyperaccumulator or recretohalophyte plants to efficiently remove salt from the water 112.

When the second plant 104 comprises a hyperaccumulator halophyte plant or a recretohalophyte plant, the salt from the third portion of the water 112 taken up by the second root system 122 is stored in tissue of the second plant 104 and the fourth portion of the water 112 has a lower salt concentration than the water 112 in the supply tank 116. The water 112 flowing from the supply tank 116, through the second array 144, and back to the supply tank 116 may cycle several times. This cycle will continue until the sensors 136 indicate that the salt in the water 112 has been sufficiently removed (i.e., reaches a predetermined low level) and is considered clean. The clean water 148 may then be pumped out of the hydroponic water treatment system 100 for later use.

There are many advantages to the above system 100. This system 100 is extremely low power, low cost, uses existing technology, and requires only enough energy to push water through the hydroponic drip lines. Because the drain lines are enclosed (i.e., not open gutters), leaves and dirt do not get into the reservoir.

Since a hydroponic wastewater treatment system 100 is a configuration of n×m (in this case 3×8) array of plants inside containers, the system can be designed into nearly any configuration to match the available land and terrain. As perennial plants and trees grow, they can easily be moved from smaller to larger pots or containers without disruption to the system. If more plants are needed, clones can be taken from existing plants or simply divided (grasses) and placed in additional containers. Further, well performing plants may be genetically modified to enhance their ion removal capability using tools such as CRISPR or, actively bred to select for enhanced ion removal capabilities.

An integrated hydroponic system 100 enables farmers to purify and reuse water in a sustainable, ultra-low power method, while permanently sequestering unwanted ions in the plants biomass or excreted as a solid. Further, this meets the most stringent regulatory requirements currently in effect by ensuring the treated water never touches the ground.

Referring to FIG. 6, an example is depicted of a flow diagram 200 using a hydroponic water treatment system 100 to perform phytoremediation on contaminated water 112 (e.g., farm drainage or irrigation water), according to aspects described herein. Phytoremediation, as used herein, includes the treatment of pollutants or waste (as in contaminated soil or groundwater) by the use of green plants that remove, degrade, or stabilize the undesirable substances (such as salt, cations or anions).

The method 200 starts at 202, wherein water 112, having contaminants such as ions and/or salts dissolved therein, is received in a supply tank 116.

At 204, the water 112 in the supply tank 116 is pumped into a first array 142 of first containerized plant systems 102A. Each first containerize plant system 102A includes a first growing container 108 and a first plant 104. The first pant 104 has a first root system 122 disposed in a substrate 110 contained in the first growing container 108.

At 206, a first portion of the water 112 is absorbed into each of the first root systems 122. Additionally, at 208, a second portion of the water 112 is retuned to the supply tank 116.

If the first plant 104 is a salt tolerant halophyte, such as Jose Tall Wheat Grass (JTWG), then at 206 the first portion of the water 112 is evaporated from the first plant 104 via evapotranspiration. Additionally, at 208, a salt concentration of the second portion of the water 112 that is returned to the supply tank would be increased. This is because salt tolerant halophytes take up a large amount of water 112 that percolates through their root systems 122, but do not absorb salt or salt ions, such as sodium or chloride ions. So, the volume of water 112 (i.e., the second portion of the water 112) returned to the supply tank 116 will be reduced substantially and the salt concentration of that water 112 will be substantially increased.

This process of reducing the volume of water and increasing its concentration may continue for several cycles until the concentration of salt in the water 112 reaches a predetermined level. At such time, the method proceeds to step 210.

At 210, the water 112 in the supply tank 116 is pumped into a second array 144 of second containerized plants systems 102B. Each second containerize plant system 102B includes a second growing container 108 and a second plant 104 that is different from the first plant. The second plant 104 has a second root system 122 disposed in a substrate 110 contained in the second growing container 108.

At 212, a third portion of the water 112 is absorbed into each of the second root systems 122. Additionally, at 214, a fourth portion of the water 112 is retuned to the supply tank 116.

If the second plant 104 is a hyperaccumulator halophyte plant, such as such as salt bush (*Atriplex lentiformis*), then at 212 the salt contained in the third portion of the water 112 is stored in tissue of the plant 104. Alternatively, if the second plant 104 is a recretohalophyte plant, such as prairie cord grass (*Spartina pectinata*), then at 212 the salt contained in the third portion of the water 112 is secreted from the tissue of the second plant 104.

Additionally, if the second plant 104 is either a hyperaccumulator halophyte plant or a recretohalophyte plant, then at 214, a salt concentration of the fourth portion of the water 112 that is returned to the supply tank 116 would be decreased. This is because hyperaccumulator halophyte plants and/or recretohalophyte plants absorb salt or salt ions, such as sodium or chloride ions from the water 112 that percolates through the root systems 122 of the plants 104. So, the volume of water 112 (i.e., the fourth portion of the water 112) that is returned to the supply tank 116 will be reduced, but also and the salt concentration of that water 112 will be substantially decreased.

Steps 210-214 of method 200 may be used to reduce salt and its resulting ions (e.g., sodium and chloride ions) from farm irrigation or drainage water. However, halophyte salt accumulators (i.e., hyperaccumulator halophyte plants) and conductors (i.e., recretohalophyte plants) are much more efficient at salt removal when faced with a high initial level of salt. However, such levels of salinity required for enhanced efficiency are generally not found on a conventional farm's drainage water 112.

Advantageously however, steps 202-208 of method 200 may be used to increase the salt content of farm irrigation or drainage water up to a level where the salt accumulators and/or conductors can work efficiently. Accordingly, method 200 combines the attributes of different types of halophytes to provide a method of removing salt from farm irrigation or drainage water that is efficient, sustainable, is extremely low power, is low cost.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it has the full scope defined by the language of the following claims.

What is claimed is:

1. A hydroponic water treatment system, comprising:
   a supply tank configured to receive water having ions and salts dissolved therein;
   an irrigation pump in fluid communication with the supply tank, the irrigation pump configured to pump the water out of the supply tank; and
   one or more first containerized plant systems in fluid communication with the irrigation pump, wherein the first containerized plant systems are above ground and each comprise:
      a first growing container, and
      a first plant, comprising a salt tolerant halophyte plant having a first root system disposed in a substrate contained in the first growing container;
   wherein each of the one or more containerized plant systems are configured to:
      receive a first portion of the water into the first root system, and
      return a second portion of the water to the supply tank; and
   wherein the first portion of the water taken up by the first root system is evaporated from the first plant via evapotranspiration and the second portion of the water increases the salt concentration in the water in the supply tank.

2. The hydroponic water treatment system of claim 1, wherein the first containerized plant systems each comprise:
   a first holding container configured to contain the first growing container therein, the first holding container including a first fluid connection, the first fluid connection being in fluid communication with the supply tank;
   wherein the first root system is configured to receive the first portion of the water from the irrigation pump via drip irrigation; and
   wherein the first fluid connection is configured to return the second portion of the water to the supply tank.

3. The hydroponic water treatment system of claim 1, wherein:
   the first plant comprises a hyperaccumulator halophyte plant; and
   the salt from the first portion of the water taken up by the first root system is stored in tissue of the first plant.

4. The hydroponic water treatment system of claim 1, wherein;
   the first plant comprises a recretohalophyte plant; and the salt from the first portion of the water taken up by the first root system is secreted from the first plant.

5. The hydroponic water treatment system of claim 1, wherein:
the first growing container is comprised of a moisture-wicking fabric, which contains pores that draw water away from an inside of the growing container and onto an outer surface of the growing container.

6. The hydroponic water treatment system of claim 1, wherein each of the first containerized plant systems are in fluid communication with a second pump, the second pump being configured to pump the second portion of water back to the supply tank.

7. The hydroponic water treatment system of claim 1, comprising:
a pre-treat tank positioned between, and in fluid communication with, the water from the irrigation pump and the one or more first containerized plant systems;
wherein the pre-treat tank is configured to remove debris from, or to inject specialty chemicals into, the water from the irrigation pump.

8. The hydroponic water treatment system of claim 1, comprising:
at least one sensor configured to measure a concentration of salt in the water; and
a control system in electromagnetic communication with the irrigation pump, the control system configured to receive a salt concentration signal from the at least one sensor indicative of a concentration of salt in the water in the supply tank;
wherein the control system is configured to control the cycling of the irrigation pump to achieve a predetermined concentration of salt in the water based on the salt concentration signal.

9. The hydroponic water treatment system of claim 1, comprising:
one or more second containerized plant systems in fluid communication with the irrigation pump, wherein the second containerized plant systems each comprise:
a second growing container, and
a second plant having a second root system disposed in a substrate contained in the second growing container;
wherein each of the one or more second containerized plant systems are above ground and configured to:
receive a third portion of the water into the second root system, and
return a fourth portion of the water to the supply tank.

10. The hydroponic water treatment system of claim 9, comprising:
a valve system in fluid communication with the irrigation pump, the one or more first containerized plant systems and the one or more second containerized plant systems;
wherein the valve system is configured to selectively connect a flow of the water from the irrigation pump to the one or more first containerized plant systems or the one or more second containerized plant systems.

11. A hydroponic water treatment system, comprising:
a supply tank configured to receive water having ions and salt dissolved therein;
an irrigation pump in fluid communication with the supply tank, the irrigation pump configured to pump the water out of the supply tank;
an array of first containerized plant systems in fluid communication with the irrigation pump, wherein the first containerized plant systems each comprise:
a first growing container, and
a first plant, comprising a salt tolerant halophyte plant having a first root system disposed in a substrate contained in the first growing container; and
an array of second containerized plant systems in fluid communication with the irrigation pump, wherein the second containerized plant systems each comprise:
a second growing container, and
a second plant having a second root system disposed in a substrate contained in the second growing container;
wherein each of the first containerized plant systems are configured to:
receive a first portion of the water into the first root system, and
return a second portion of the water to the supply tank;
wherein each of the second containerized plant systems are configured to:
receive a third portion of the water into the second root system, and
return a fourth portion of the water to the supply tank; and
wherein the first portion of the water taken up by the first root system is evaporated from the first plant via evapotranspiration and the second portion of the water increases a salt concentration in the water in the supply tank.

12. The hydroponic water treatment system of claim 11, wherein the first containerized plant systems each comprise:
a first holding container configured to contain the first growing container therein, the first holding container including a first fluid connection, the first fluid connection being in fluid communication with the supply tank;
wherein the first root system is configured to receive the first portion of the water from the irrigation pump via drip irrigation; and
wherein the first fluid connection is configured to return the second portion of the water to the supply tank.

13. The hydroponic water treatment system of claim 12, wherein the second containerized plant systems each comprise:
a second holding container configured to contain the second growing container therein, the second holding container including a second fluid connection, the second fluid connection being in fluid communication with the supply tank;
wherein the second root system is configured to receive the third portion of the water from the irrigation pump via drip irrigation; and
wherein the second fluid connection is configured to return the fourth portion of the water to the supply tank.

14. The hydroponic water treatment system of claim 11, wherein:
the second plant comprises a hyperaccumulator halophyte plant; and
salt from the third portion of the water taken up by the second root system is stored in tissue of the second plant and the fourth portion of the water decreases the salt concentration of the water in the supply tank.

15. The hydroponic water treatment system of claim 14, wherein;
the second plant comprises a recretohalophyte plant; and
the salt from the third portion of the water taken up by the second root system is secreted from the second plant and the fourth portion of the water decreases the salt concentration of the water in the supply tank.

16. A method of phytoremediation of contaminated water, comprising:
- receiving water having ions and salts dissolved therein into a supply tank;
- pumping the water in the supply tank into a first array of first containerized plant systems, wherein each first containerize plant system comprises:
  - a first growing container, and
  - a first plant having a first root system disposed in a substrate contained in the first growing container;
- absorbing a first portion of the water into each of the first root systems;
- evaporating the first portion of the water from the first plant via evapotranspiration;
- returning a second portion of the water to the supply tank;
- increasing a salt concentration of the second portion of the water that is returned to the supply tank;
- pumping the water in the supply tank into a second array of second containerized plant systems, wherein each second containerize plant system comprises:
  - a second growing container, and
  - a second plant, different from the first plant, having a second root system disposed in a substrate contained in the second growing container;
- absorbing a third portion of the water into each of the second root systems; and
- returning a fourth portion of the water to the supply tank.

17. The method of claim 16, comprising:
- storing salt contained in the third portion of the water in tissue of the second plant; and
- decreasing a salt concentration of the fourth portion of the water that is returned to the supply tank.

18. The method of claim 16, comprising:
- secreting salt contained in the third portion of the water from tissue of the second plant; and
- decreasing a salt concentration of the fourth portion of the water that is returned to the supply tank.

* * * * *